US012580476B2

(12) United States Patent
Murthy et al.

(10) Patent No.: US 12,580,476 B2
(45) Date of Patent: Mar. 17, 2026

(54) SYSTEMS AND METHODS FOR ENERGY DELIVERY

(71) Applicant: Rivian IP Holdings, LLC, Plymouth, MI (US)

(72) Inventors: Puneeth Kumar Srikanta Murthy, Irvine, CA (US); Ming Li, Torrance, CA (US); Lixiang Wei, Irvine, CA (US); Steven Schulz, Torrance, CA (US); Walter Axel Franck, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 656 days.

(21) Appl. No.: 18/060,733

(22) Filed: Dec. 1, 2022

(65) Prior Publication Data

US 2024/0186885 A1     Jun. 6, 2024

(51) Int. Cl.
| | |
|---|---|
| *H02M 1/10* | (2006.01) |
| *B60L 53/22* | (2019.01) |
| *B60L 53/62* | (2019.01) |
| *B60L 53/66* | (2019.01) |
| *H02M 1/00* | (2006.01) |
| *H02M 1/32* | (2007.01) |
| *H02M 1/36* | (2007.01) |

(52) U.S. Cl.
CPC .............. *H02M 1/10* (2013.01); *B60L 53/22* (2019.02); *B60L 53/62* (2019.02); *B60L 53/66* (2019.02); *H02M 1/0006* (2021.05); *H02M 1/32* (2013.01); *H02M 1/36* (2013.01)

(58) Field of Classification Search
CPC ...................................................... H02M 1/10
See application file for complete search history.

(56) References Cited

U.S. PATENT DOCUMENTS

| | | | | |
|---|---|---|---|---|
| 5,784,626 | A  * | 7/1998 | Odaohara ............... | H02J 9/061 |
| | | | | 713/340 |
| 9,573,474 | B2 * | 2/2017 | Mensah-Brown ...... | B60L 50/40 |
| 10,693,367 | B1 * | 6/2020 | Chatterjee ............... | H02M 1/36 |
| 10,840,734 | B2 * | 11/2020 | Nguyen .................... | H02J 9/06 |
| 11,139,654 | B2 * | 10/2021 | Ghotra .................... | H02M 7/44 |
| 11,498,443 | B1 * | 11/2022 | Akella .................... | H02J 7/005 |
| 2005/0088868 | A1 * | 4/2005 | Ryan .................... | H02M 7/062 |
| | | | | 365/65 |
| 2012/0112693 | A1 * | 5/2012 | Kusch .................... | B60L 58/20 |
| | | | | 320/109 |
| 2012/0228944 | A1 * | 9/2012 | Koshin .................... | H02J 7/34 |
| | | | | 307/66 |
| 2014/0361725 | A1 * | 12/2014 | Nishikawa ................ | H02J 3/32 |
| | | | | 320/101 |

(Continued)

*Primary Examiner* — Daniel Kessie

(74) *Attorney, Agent, or Firm* — Foley & Lardner LLP

(57) ABSTRACT

Energy conversion is provided. An energy conversion device can include one or more power delivery interfaces. The energy conversion device can include a pre-charge circuit configured to charge a capacitor to an operating voltage. The energy conversion device can include a user accessible interface configured to provide energy to the pre-charge circuit. The pre-charge circuit can charge the capacitor associated with the one or more power delivery interfaces. The user-accessible interfaces can include a direct current (DC) input. The user-accessible interfaces can include an alternating current (AC) input.

19 Claims, 9 Drawing Sheets

100

```
                        ┌──────────┐
                        │ Battery  │──110
                        └──────────┘
                             │
┌─────────────────────────────────────────────────────────┐
│ Energy Conversion Device                                  │
│      102          ┌────────────┐         ┌──────────┐     │
│             108 ──│ Battery PDI │   ┌─116 │ AC Input │──120│
│                   └────────────┘   │     └──────────┘     │
│                              ┌───────────┐                │
│                              │ Pre-charge│                │
│                              │  Circuit  │                │
│                   ┌──────────┐└───────────┘┌──────────┐   │
│             112 ──│ Capacitor│      ┌─118  │ DC Input │──122│
│                   └──────────┘      │      └──────────┘   │
│                              ┌───────────┐                │
│                              │ Controller│                │
│                   ┌──────────┐└───────────┘               │
│             114 ──│  Power    │        └─124              │
│                   │Conversion │                           │
│                   └──────────┘                            │
│                        │                                  │
│             104 ──┌──────────┐                            │
│                   │ Grid PDI │                            │
└───────────────────└──────────┘────────────────────────────┘
                         │
                   ┌──────────┐
                   │   Grid   │──106
                   └──────────┘
```

(56) References Cited

U.S. PATENT DOCUMENTS

| | | | |
|---|---|---|---|
| 2016/0046202 A1* | 2/2016 | Yamamoto | B60L 53/65 |
| | | | 307/10.1 |
| 2017/0077704 A1* | 3/2017 | Faley | H02J 5/00 |
| 2023/0155376 A1* | 5/2023 | Lee | H02J 7/0031 |
| | | | 307/26 |
| 2025/0023343 A1* | 1/2025 | Hargash | H02H 7/261 |

* cited by examiner 700                                    705

Couple charger cable with
electric vehicle

710

Couple AC Input or
Couple DC Input

720

Arbitrate Source

725

Activate controller

730

Insulation test

735

Pre-charge capacitor

740

Close contactors

745

Receive Energy

SYSTEMS AND METHODS FOR ENERGY DELIVERY

INTRODUCTION

Electrical devices can perform validation or handshaking procedures to form connections therebetween. The procedures can employ electrical power to communicate or sense various conditions.

SUMMARY

The proposed solution provides two user accessible ports. One port provides the user to be able to plug in an alternating current (AC) input and the other power provides the user to plug in a low voltage direct current (DC) input. The low voltage (LV) input can be coupled to an existing connection terminal for the battery connector. The user accessible AC input is used to generate the DC bus voltage using a diode bridge that goes into a high voltage (HV) to LV isolated switch-mode power supply (SMPS). Blocking Diodes provide an OR connection for the two inputs and prevent back feeding of power from the external AC source. Blocking diodes perform a similar function on the LV side user accessible connector. The AC input can include, for example, from 85 VAC to 265 VAC or commonly available AC inputs (e.g., about 120V or about 240V). The DC voltage can include 5 VDC, 12 VDC, 24 VDC, 48 VDC, or commonly available LV DC inputs.

At least one aspect is directed to a system. The system can include an energy conversion device. The energy conversion device can include one or more power delivery interfaces. The energy conversion device can include a pre-charge circuit. The pre-charge circuit can charge a capacitor to an operating voltage. The energy conversion device can include a user accessible interface to provide energy to the pre-charge circuit. The pre-charge circuit can charge the capacitor associated with the one or more power delivery interfaces with the energy from the user accessible interface. The user accessible interface can include a direct current (DC) input. The user accessible interface can include an alternating current (AC) input.

At least one aspect is directed to a method. The method can include activating a controller. The activation of the controller can be based on connecting a first power delivery interface between an energy conversion device and a first energy source and connecting a user accessible interface to a second energy source. The method can include charging a capacitor to a voltage exceeding a voltage supplied by the second energy source. The user accessible interface can include a DC input and an AC input, and the second energy source can be coupled to the DC input or the AC input. The method can include closing a switchable connection between the energy conversion device and the first energy source. The method can include receiving energy from the first energy source at the first power delivery interface.

At least one aspect is directed to an energy conversion device. The energy conversion device can include a first power delivery interface to interface with an energy source. The first power delivery interface can include a normally open switchable connection. The energy conversion device can include a user accessible interface to provide power to a controller. The user accessible interface can include a DC input. The user accessible interface can include an AC input. The controller can activate in response to the provision of energy. The controller can generate a first control signal to charge a capacitor associated with the first power delivery interface. The controller can generate a second control signal to close the normally open switchable connection.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for energy delivery. The various concepts introduced above and discussed in greater detail below may be implemented in any of numerous ways.

This disclosure is generally directed to a bidirectional charging system. The bidirectional charging system can interface with an energy source (such as the battery of an electric vehicle) and a grid input such as a regional grid, local grid, or micro grid (e.g., a solar array). The energy source can be a rechargeable energy source. Upon interruption of energy at the grid input, such as following a grid outage, sunset, or other power loss event, the charging system can receive energy from the energy source. To establish a connection with the energy source, the charger can use an energy source to communicate with the energy source, or prepare an interface port to connect with the energy source. For example, the charging system can use energy to charge a capacitor of an interface to prevent or reduce an inrush current to the charging system upon a connection of the energy source thereto.

The charging system can include two user accessible ports to provide energy. One port can be an alternating current (AC) input such as a 120 VAC or 240 VAC input. Another port can be a low voltage direct current (DC) source (e.g., 5-50 VDC). One or more of the user accessible ports can generate a low-voltage DC bus. The one or more user accessible ports can be segregated by one or more blocking diodes. The low-voltage DC bus can power a controller and a pre-charge circuit. The controller can establish a connection with the energy source to determine a battery voltage. The controller can cause a pre-charge circuit to charge based on the battery voltage, or based on a test voltage. The controller can cause a pre-charge voltage to close a switchable connection to electrically interconnect the energy source with the charging system to receive energy from the energy source.

Figure 1:
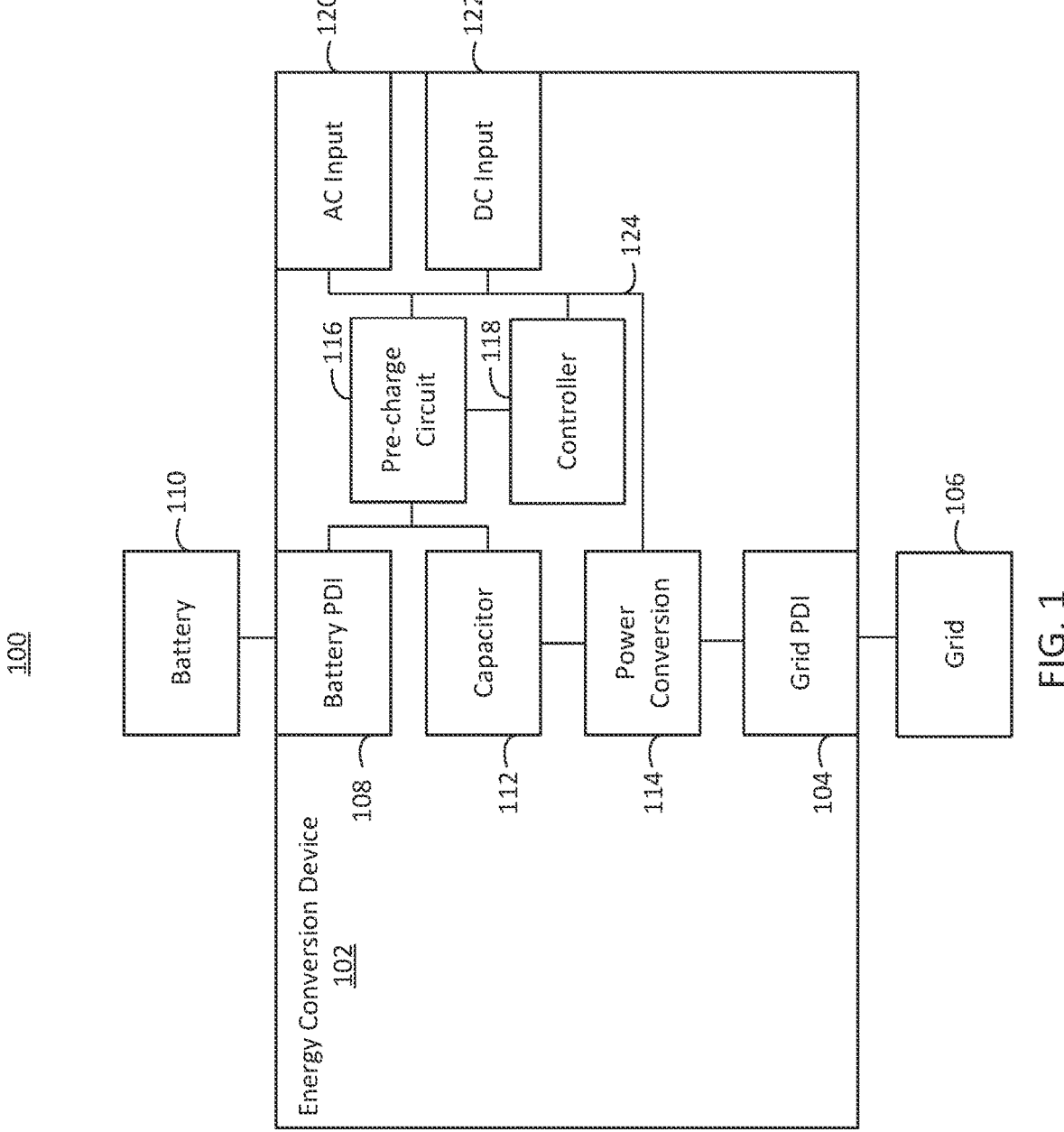
FIG. 1 depicts a system including an energy conversion device to interface with an energy source, in accordance with some aspects.

FIG. 1 depicts an example system 100 including an energy conversion device 102 to interface with an energy source, in accordance with some aspects. For example, the energy source can be an battery 110 of an electric vehicle, a fuel cell, or a generator. The system 100 can include, interface, or communicate with one or more energy sources or sinks. For example, the energy conversion device 102 can interface with a grid 106 and a battery 110 of an electric vehicle. The energy conversion device 102 can provide power to a power sink such as a residential or commercial property. For example, the system 100 can provide power to charge a battery 110 of an electric vehicle from the grid 106 in a first mode of operation, and provide energy to the grid 106 or another power sink (e.g., the residential or commercial property) in a second mode of operation.

The energy conversion device 102 can include at least one grid power delivery interface 104 to exchange energy with a grid 106. The energy conversion device 102 can include a battery power delivery interface 108 to connect to a battery 110 or other energy source or sink. The energy conversion device 102 can include a capacitor 112 electrically connected to one or more power delivery interfaces. The energy conversion device 102 can include a power conversion circuit 114 to interface between a low voltage bus 124 and a power delivery interface. The energy conversion device 102 can include a pre-charge circuit 116 to convert an interface voltage to a voltage for the battery power delivery interface 108. The energy conversion device 102 can include a controller 118 to execute instructions to control the operation of other components of the energy conversion device 102. The energy conversion device 102 can include one or more user accessible interfaces. For example, the user accessible interfaces can include an AC input 120 and a DC input 122.

The grid power delivery interface 104, battery power delivery interface 108, power conversion circuit 114, pre-charge circuit 116, controller 118, AC input 120, and DC input 122 can each include at least one processing unit or other logic device such as a programmable logic array engine, or a module configured to communicate with a data repository or database. The grid power delivery interface 104, battery power delivery interface 108, power conversion circuit 114, pre-charge circuit 116, controller 118, AC input 120, or DC input 122 can be separate components, a single component, or part of the energy conversion device 102. The energy conversion device 102 can include hardware elements, such as one or more processors, logic devices, or circuits. For example, the energy conversion device 102 can include one or more components or structures of functionality of the computing device depicted in FIG. 9.

Still referring to FIG. 1, the energy conversion device 102 can include at least one grid power delivery interface 104. The grid power delivery interface (PDI) 104 can receive an AC signal of a grid 106. For example, the grid PDI 104 can receive AC power (e.g., single phase, three phase, or four phase). The grid PDI 104 can include or interface with an inverter. The inverter can receive an AC signal from the grid 106 and rectify the AC signal to a DC signal. The grid PDI 104 can receive a DC signal from an energy grid 106. For example, grid power delivery interface 104 can received the rectified signal or the energy grid 106 can be a DC grid 106 (e.g., a solar array micro-grid 106). The grid PDI 104 can include or interface with a DC to DC converter such as an maximum power point tracker (MPPT).

The grid PDI 104 can exchange power with an energy storage device (e.g., fuel cell or battery 110). For example the grid PDI 104 can receive power through a directly coupled battery 110, or a battery 110 coupled through an inverter or DC to DC converter. The grid PDI 104 can charge the battery 110 with energy received from the energy grid 106, or from the battery PDI 108. For example, the grid PDI 104 can receive power sourced from a battery 110 of an electric vehicle. The grid PDI 104 can provide said energy to the grid 106 or a stationary battery backup (e.g., for a structure).

The energy conversion device 102 can interface with a grid 106. The grid 106 can include a regional energy grid 106, a local energy grid 106, or a micro grid 106 (e.g., for a neighborhood or individual structure). The grid 106 can include or interface with a transceiver to communicate information associated with the grid 106. For example, the transceiver can be communicatively coupled to a controller 118. The transceiver can communicate pricing, demand, or status information associated with the grid 106. The grid 106 can include or interface with various energy sinks such as residential, commercial, or industrial users. For example, a micro-grid 106 can include the sinks of a residential structure (e.g., lights, appliances, or outlets). The energy conversion device 102 can provide energy to one or more circuits of the grid 106. For example, the energy conversion device 102 can supply power to a residence in the absence of an energy supply of a regional grid 106, such as energy received from a battery 110 of an electric vehicle.

The energy conversion device 102 can include at least one battery PDI 108. The battery PDI 108 can include a plug or receptacle at a terminal end of a cable to interface with an energy source such as an electric vehicle. The cable can include various conductors (e.g., communication conductors or power delivery conductors). For example, the conductors can include one or more DC or AC conductors, a protective earth conductor, or a conductor to indicate a presence of an electric vehicle with respect to the cable (e.g., to detect a latched plug of the cable) or to communicate therewith.

The cable can include electrical insulation. The battery PDI 108 can include or interface with at least one sensor to detect a condition of the cable insulation. For example, the sensor can include a current sensor to determine a leakage current associated with the power delivery conductors or a voltage sensor to determine a voltage at a distal end of the cable. The battery PDI 108 can include a switchable connection to selectively connect to a battery 110 of an electric vehicle. For example, the switchable connection can be opened prior to verifying a condition of the cable insulation, and thereafter closed to electrically connect the battery 110 of the electric vehicle to the energy conversion device 102. The switchable connection can electrically connect one or more of the conductors between the electric vehicle and the energy conversion device 102. The switchable connection can be a normally open switchable connection. A controller 118 can be configured to close the normally open switchable connection upon a verification of a status of the energy conversion device 102 or any associated devices. While opened, one or more conductors (e.g., one or more power delivery conductors) can be energized to a test voltage. The condition of the insulation can be detected at the test voltage. Upon a determination that the insulation is in an operable condition, the switchable connection can be closed to exchange energy with the battery. A switchable connection can refer to a switchable connection of the electric vehicle communicatively coupled with the controller 118. For example, each or either of the electric vehicle or the energy conversion device 102 can include a switchable connection which can close to convey power between the electric vehicle and the energy conversion device 102.

The energy conversion device 102 can interface with a battery 110 or another energy storage device. For example, the energy conversion device 102 can alternatively provide energy to the battery 110 to charge the battery 110 in the presence of power from the grid 106. The energy conversion device 102 can provide energy to the grid 106 or to individual circuits thereof. For example, the energy conversion device 102 can provide power to the grid 106 or circuits thereof incident to a price, status, or availability associated with the grid 106. For example, the energy conversion device 102 can provide power to a structure in response to a loss of power from the grid 106, or provide power to a grid 106 in response to a grid condition (e.g., a request for demand reduction or for a supply increase). One or more processors associated with the grid 106 can communicate the grid condition with the controller 118. For example, the controller 118 can receive a voltage level, price, forecast, or other message. A grid condition or a status of an electrical connection to the grid 106 can be referred to as a power event.

The energy conversion device 102 can include at least one capacitor 112 designed, constructed, or operational to sink, source, or store energy. For example, the capacitor 112 can maintain a voltage. The voltage can be a test voltage such as about 500 volts or a voltage to exchange power with the battery 110. Upon a connection of a battery 110 to the energy conversion device 102, the energy conversion device (e.g., via capacitor 112) can deliver energy (e.g., output power to the battery 110) based on a higher voltage of the capacitor 112 than the battery 110. The capacitor 112 can sink energy (e.g., receive power from the battery 110) according to a capacitor voltage less than the battery voltage. The capacitor 112 can include any number of constituent capacitors 112. For example, for a 400 volt nominal battery 110, the capacitor 112 can exchange power with the battery 110 at about 270 volts to about 500 volts. For an 800 volt nominal battery, the capacitor 112 can exchange power with the battery 110 at between about 540 volts to about 1000 volts. At least one capacitor 112 can be coupled to or included in each power delivery interface. For example, a different capacitor 112 can be coupled to or included in each of the battery PDI 108 or the grid PDI 104.

The energy conversion device 102 can include at least one power conversion circuit 114. The power conversion circuit 114 can convey power between one or more PDIs, buses, or user-accessible interfaces (e.g., the AC input 120 or DC input 122). For example, the power conversion circuit 114 can be or include a converter to convert between one or more input voltages and a bus voltage. For example, the power conversion circuit 114 can include a boost converter to receive a voltage (e.g., a DC voltage from about 5 V to about 50 V or an AC voltage of about 120 V or 240 V). The power conversion circuit 114 can convert the received voltage to at least one bus voltage. For example, the bus voltage can be a supply voltage for a controller 118, or a pre-charge circuit 116.

The power conversion circuit 114 can convey energy between one or more PDIs. For example, the power conversion circuit 114 can exchange (e.g., send or receive) energy with the grid PDI 104 at a first voltage (e.g., a DC or AC voltage), and exchange the energy with a battery PDI 108 at a second voltage (e.g., a DC or AC voltage). The energy conversion device 102 can receive energy from a grid 106, to charge a battery 110 of an electric vehicle, or receive energy from the battery 110 of the electric vehicle to provide energy to the grid 106. The power conversion circuit 114 can include signal inputs such as analog or digital inputs to define an output voltage. For example, the power conversion circuit 114 can receive inputs from a controller 118 to adjust a voltage on an output (e.g., to adjust a charge rate for a battery 110).

The power conversion circuit 114 can exchange power between a PDI and a low voltage bus 124. For example, the low voltage bus 124 can interconnect various component of the energy conversion device 102 at a voltage of less than 50 volts (e.g., 5 volts, 12 volts, 24 volts, or 48 volts). The power conversion circuit 114 can provide energy to the low energy bus from at least one PDI or can provide energy to the PDI from a user accessible input. The power conversion circuit 114 can receive energy from an energy storage device of the energy conversion device 102 (e.g., a super-capacitor or battery backup).

The energy conversion device 102 can include at least one pre-charge circuit 116. The pre-charge circuit 116 can generate a test voltage or a target voltage. For example, the pre-charge circuit 116 can include a boost converter to source energy from a low voltage bus 124 to generate a test voltage. The test voltage can be a fixed voltage of about 500 volts or can be based on a voltage associated with a battery 110. For example, the energy conversion device 102 can receive a target voltage from the controller 118 (or a signal to cause the pre-charge circuit 116 to generate the target voltage). For example, prior to charging a battery 110 having a nominal or maximum voltage of 800 V, the pre-charge circuit 116 can generate a test voltage in excess of 800V (e.g., about 880 V or about 1000 volts). The pre-charge circuit 116 can energize one or more portions of the battery PDI 108 to an operating voltage to interface with an energy source, such as the depicted battery 110. For example, the pre-charge circuit 116 can energize the battery PDI 108 to a test voltage (e.g., about 500 volts), responsive to a first message from the controller 118. The pre-charge circuit 116 can energize the battery PDI 108 to an operating voltage (e.g., about 400 volts), responsive to a second message from the controller 118.

The energy conversion device 102 can include at least one controller 118 to define an target voltage of the pre-charge circuit 116 or the capacitor 112. For example, the controller 118 can determine an target voltage for the pre-charge circuit 116 of the capacitor 112 of about 500 V (to be provided via the battery PDI 108). The target voltage can be a test voltage to verify a condition of the battery PDI 108 (e.g., insulation thereof). The target voltage can be an operating voltage to exchange energy between the battery 110 and the energy conversion device 102. The voltage can be higher than a voltage received by a user accessible interface (e.g., a maximum, average, or root means squared (RMS) voltage). The controller 118 can define the voltage based on a communications channel establish between the electric vehicle and the controller 118. For example, the communications channel can be established over a conductor of the battery PDI 108, or a wireless transceiver associated with the battery 110 of an electric vehicle.

The energy conversion device 102 can include at least one user accessible interface to provide energy to the energy conversion device 102. For example, the energy can be provided to a controller 118 of the energy conversion device 102 or a pre-charge circuit 116 of the energy conversion device 102. The pre-charge circuit 116 or the controller 118 can communicate with the battery 110 or an electric vehicle associated therewith, verify a condition of a cable, and engage an electrical connection with the battery 110 to receive energy therefrom. Various user accessible interfaces can be separated from one another, or from another interface (e.g., a battery or super-capacitor back-up) by blocking diodes to logically OR the inputs, a contactor, relay, or other selectable switch.

The user accessible interface can include at least one AC input 120. The AC input 120 can be about 120 volts or about 240 volts. For example, the AC input 120 can be sourced from a generator, an electric vehicle, or a grid 106. The AC input 120 can include or interface with a rectification circuit to rectify a signal from the AC input 120, and an AC to DC conversion circuit to convert the rectified signal to generate a DC bus level signal. The user accessible interface can include at least one DC input 122. The DC input 122 can be or include a connector or otherwise be configured to couple with one or more connectors (e.g., a USB connector, coaxial connector, or clamp of a jumper cable). One or more terminals of the DC input 122 can be a chassis of the energy conversion device 102. For example, a chassis ground of the energy conversion device 102 can be a terminal (e.g., a ground) of the DC input 122.

Figure 2:
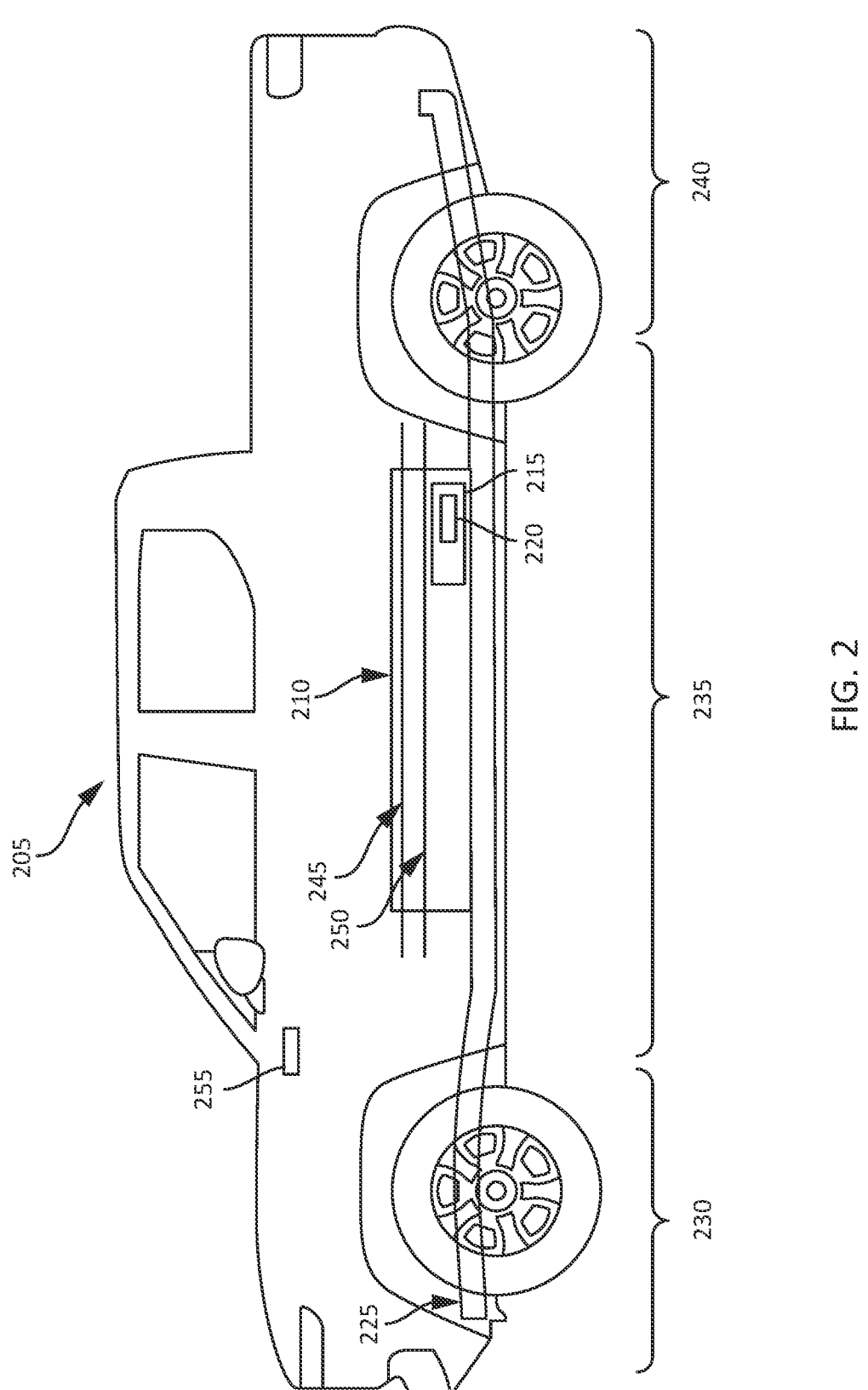
FIG. 2 is an electric vehicle comprising a battery to interface with the energy conversion device of FIG. 1, in accordance with some aspects.

FIG. 2 is an electric vehicle 205 comprising a battery 110 to interface with the energy conversion device 102 of FIG. 1, in accordance with some aspects. Electric vehicles 205 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery 110 can also be used as an energy storage system to power a building, such as a residential home or commercial building. Electric vehicles 205 can be fully electric or partially electric (e.g., plug-in hybrid) and further, electric vehicles 205 can be fully autonomous, partially autonomous, or unmanned. Electric vehicles 205 can also be human operated or non-autonomous.

Electric vehicles 205 such as electric trucks or automobiles can include on-board batteries 110, or battery modules 215, or battery cells 220 to power the electric vehicles 205. The electric vehicle 205 can include a chassis 225 (e.g., a frame, internal frame, or support structure). The chassis 225 can support various components of the electric vehicle 205. The chassis 225 can span a front portion 230 (e.g., a hood or bonnet portion), a body portion 235, and a rear portion 240 (e.g., a trunk, payload, or boot portion) of the electric vehicle 205. The battery 110 can be installed or placed within the electric vehicle 205. For example, the battery 110 can be installed on the chassis 225 of the electric vehicle 205 within one or more of the front portion 230, the body portion 235, or the rear portion 240. The battery 110 can include or connect with at least one busbar, e.g., a current collector element. For example, the first busbar 245 and the second busbar 250 can include electrically conductive material to connect or otherwise electrically couple the battery modules 215, or the battery cells 220 with other electrical components of the electric vehicle 205 to provide electrical power to various systems or components of the electric vehicle 205 or the energy conversion device 102.

An vehicle interface 255 can include a plug or receptacle to interface with the energy conversion device 102. The vehicle interface 255 can include a conductor to convey energy from the energy conversion device 102 to a battery 110 of the electric vehicle 205. At least one switchable connection can intermediate the battery 110 of the electric vehicle 205 and the capacitor 112 of the energy conversion device 102. The electric vehicle 205 can include a further capacitor 112 distal the switchable connection, with respect to the capacitor 112 of the energy conversion device 102. The vehicle interface 255 can include one or more sensors to detect a condition of the battery 110 or switchable connection. The vehicle interface can communicate with the controller 118. The vehicle interface 255 can include a transceiver to convey sensor data or control signals between the electric vehicle 205 and the energy conversion device 102 (e.g., battery voltage, switchable connection status, or an indication to open or close a switchable connection).

Figure 3:
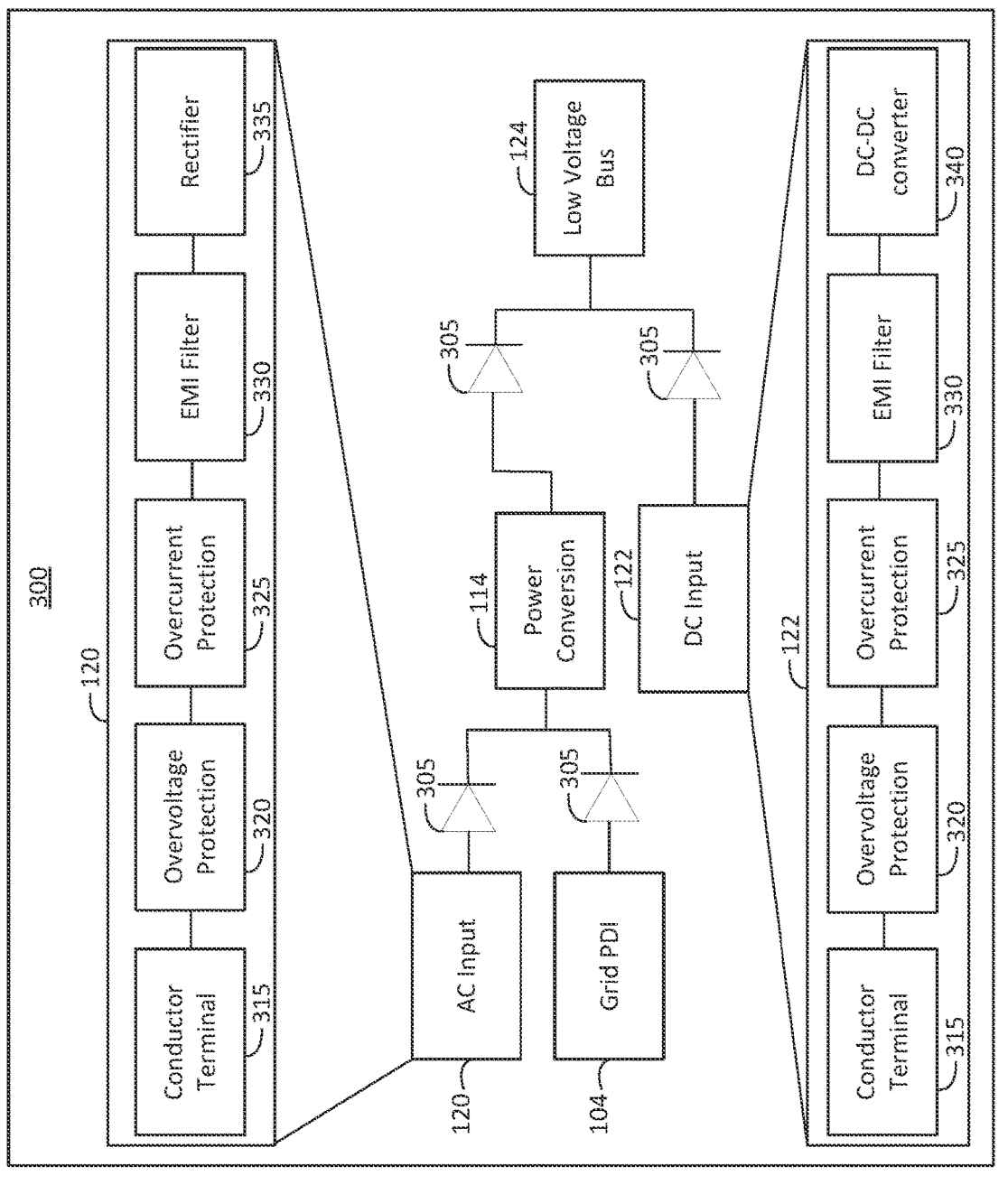
FIG. 3 is a circuit for a one or more user accessible interfaces, in accordance with some aspects.

FIG. 3 is a circuit 300 for a one or more user accessible interfaces, in accordance with some aspects. The circuit 300 can include an AC input 120, a DC input 122, or a grid PDI 104. The grid PDI 104 can supply DC power to the circuit 300, or the grid PDI 104 can supply AC power to the circuit 300 for rectification. The circuit 300 can receive AC power from a user accessible AC input 120. The circuit 300 can select between the various inputs thereto. For example, one or more blocking diodes 305 can intermediate the AC input 120 and the grid PDI 104 from a power conversion circuit 114.

The AC input 120 can include terminal conductors such as a live wire and a return wire. The AC conductor terminals 315 can be isolated from a chassis of the energy conversion device 102 or the other inputs or outputs. The AC conductor terminals 315 can receive wire conductors, such as via a plug or receptacle (e.g., national electrical manufacturers association (NEMA) 15-5). The AC input 120 can include overvoltage protection 320 (e.g., a metal oxide varistor or a transient voltage suppression diode), a fuse or other overcurrent protection 325 (e.g., a resettable relay), electromagnetic interference (EMI) suppression or filtering devices 330 (e.g., inductors, ferrite beads, or other filters). The AC input 120 can include a rectifier 335 to rectify an input signal, or a power conditioner to condition an input signal. For example, the AC input 120 can include a bulk capacitance on a first side of the blocking diode 305, or the power conversion circuit 114 can include a bulk capacitance on a second, opposite side of the blocking diode 305. One or more components of the rectifier 335 can interface or overlap with the blocking diode.

The power conversion circuit 114 can receive energy from the AC input 120 or the grid PDI 104. The power conversion circuit 114 can convert, pass through, or filter energy received from the user accessible interface to the low voltage bus 124. The power conversion circuit 114 can include a switch-mode power supply, linear power supply, or other power conversion or filtering components. The power conversion circuit 114 can supply a low-voltage bus 124. For example, the power conversion circuit 114 can convert various input voltages to a pre-defined voltage for the low voltage bus 124 (e.g., 24 volts). The power conversion circuit 114 can provide one or more voltage rails or phases. For example, the power conversion circuit 114 generate a 5V, 3.3V, or 1.2V rail. The power conversion circuit can derive each rail from current provided from the blocking diodes 305 or another phase of the power conversion circuit 114. Various rails can provide energy to a low voltage bus 124, a grid PDI 104, a controller 118, or other components of the energy conversion device 102.

A DC input 122 can include a DC conductor terminal 315. The DC conductor terminal 315 can be isolated from a chassis of the energy conversion device 102 or the other inputs or outputs, or can share one or more terminals. For example, a ground of the DC input 122 can be a chassis ground of the energy conversion device 102. The DC conductor terminals 315 can receive wire conductors, such as via a plug or receptacle, or by other terminals. For example, the DC conductor terminal 315 can include a USB input, terminals of a 9V battery, or a stud configured to electrically connect to an alligator clip of jumper cables. The DC input 122 can include overvoltage protection 320 (e.g., a metal oxide varistor or a transient voltage suppression diode), a fuse or other overcurrent protection 325 (e.g., a resettable relay), EMI suppression or filtering devices 330 (e.g., inductors, ferrite beads, or other filters). The DC input 122 can include a DC to DC converter 340. For example, the DC input 122 can include a DC to DC converter 340 between an input range (e.g., between about five volts and about fifty volts), and a voltage or voltage range for the low voltage bus 124 (e.g., between about five volts and about fifty volts). The DC to DC converter 340 can be independent of or share one or more components with the power conversion circuit 114.

One or blocking diodes 305 for the low-voltage bus 124 can isolate inputs to the low voltage bus 124 from each other (e.g., prevent back-feeding). For example, the power conversion circuit 114 or DC input 122 can be segregated by the blocking diodes 305. The depicted inputs are not intended to be limiting. For example, a battery, super-capacitor, or other backup (not depicted) intrinsic to the energy conversion device 102 can be disposed in parallel with the AC input 120 or the DC input 122. A blocking diode 305 (not depicted) can isolate the backup from the AC input 120 or the DC input 122 (e.g., in parallel with the input blocking diodes 305). The low voltage bus 124 can supply energy to a controller 118, a pre-charge circuit 116, or other elements of the energy conversion device 102.

Figure 4:
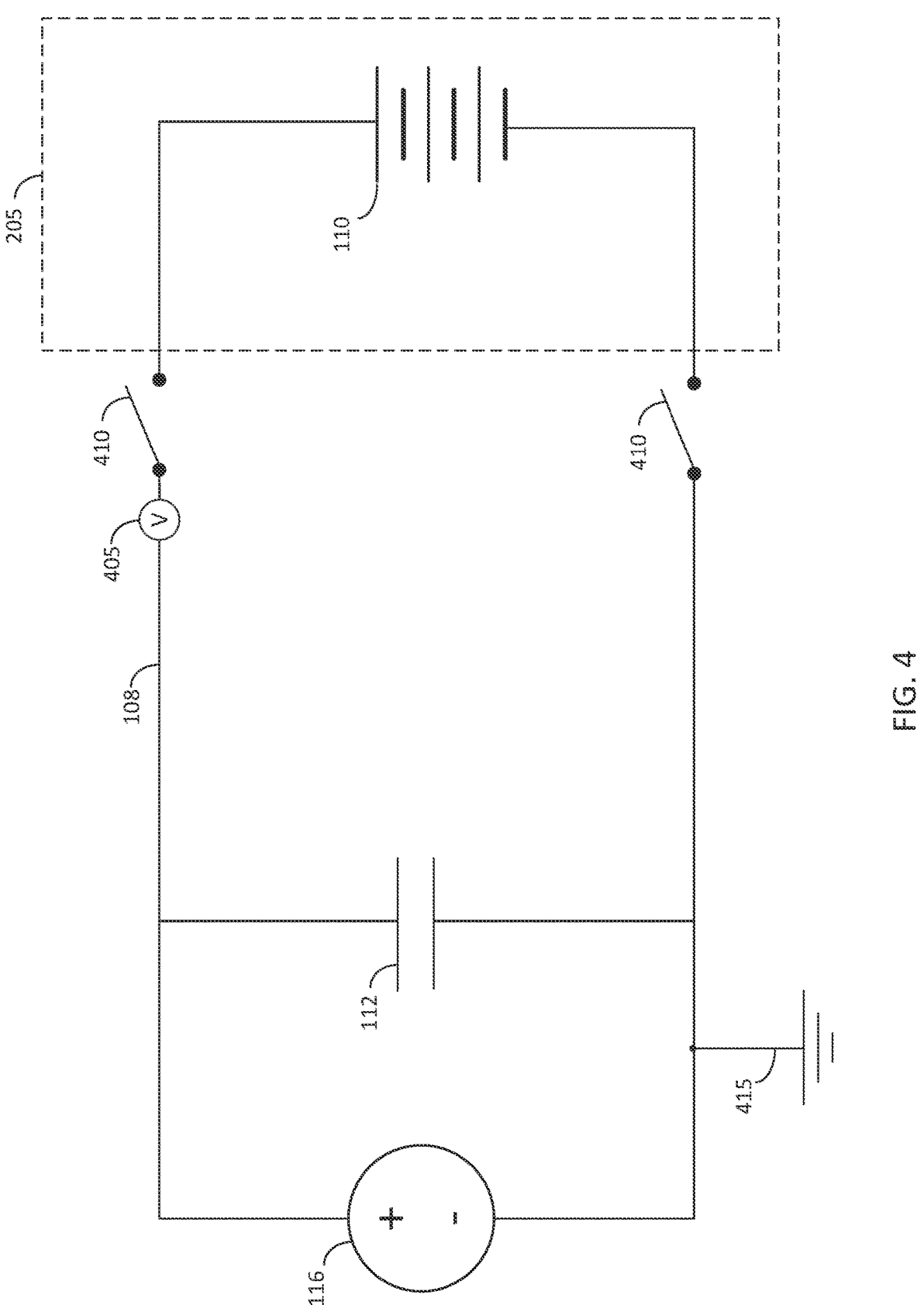
FIG. 4 is a depiction of an electric vehicle and an energy conversion device, in accordance with some aspects.

FIG. 4 is a depiction of an electric vehicle 205 and an energy conversion device 102, in accordance with some aspects. A pre-charge circuit 116 can supply a test voltage to the capacitor 112. The pre-charge circuit 116 can receive energy from the low voltage bus 124. The pre-charge circuit 116 can include a DC to DC converter. The DC converter can generate a variable output voltage. The DC to DC converter can charge the capacitor 112 to a test voltage (e.g., about 500 volts). A sensor 405 can sense a condition indicative of a state of insulation of the battery PDI 108. The sensor 405 can include a voltage sensor 405 to detect a signal delivered by the pre-charge circuit 116. For example, the sensor 405 can detect a capacitor voltage or a rise time thereof. The sensor 405 can detect a steady state current delivered to the capacitor 112. The sensor 405 can convey sensor data to the controller 118. The controller 118 can cause one or more switchable connections 410 to actuate, or cause the pre-charge circuit 116 to halt energy delivery to the capacitor 112 responsive to the sensor data. The controller 118 can compare a current, voltage, or time to a predefined threshold. For example, the controller 118 can compare a time to reach a predefined voltage (e.g., the test voltage or another voltage, such as about 50 volts) to a threshold time, or the controller 118 can compare a steady state current delivered to the capacitor 112 to a pre-defined voltage. The controller 118 can establish a threshold indicative or an allowable stat of the insulation. For example, the controller can establish a maximum steady state current of 0.1 mA. 1 mA, or 10 mA.

The controller 118 can adjust an output voltage of the pre-charge circuit 116. For example, the controller 118 can adjust the output of the pre-charge circuit 116 to match a battery voltage for a battery 110 of the electric vehicle 205. The controller 118 can cause one or more switchable connections 410 to close, responsive to the determination of the condition of the battery PDI 108, or upon an adjustment of the voltage. For example, switchable connections 410 of the electric vehicle 205 or the battery PDI 108 can intermediate other components of the electric vehicle 205 or battery PDI 108. The controller 118 can close said connections to cause energy to be exchanged between the battery 110 and the energy conversion device 102. For example, the energy conversion device 102 can receive energy from the battery 110. Said energy can displace energy received from one or more user accessible interfaces (e.g., may be a higher voltage than other energy sources applied to parallel blocking diodes 305).

The switchable connections 410 can intermediate the electric vehicle 205 and the energy conversion device 102 along one or more conductors. For example, one or more reference planes 415, or communicative connections (wired or wireless) can be established between the electric vehicle 205 and the energy conversion device 102 which are not intermediated by the switchable connections 410.

Figure 5:
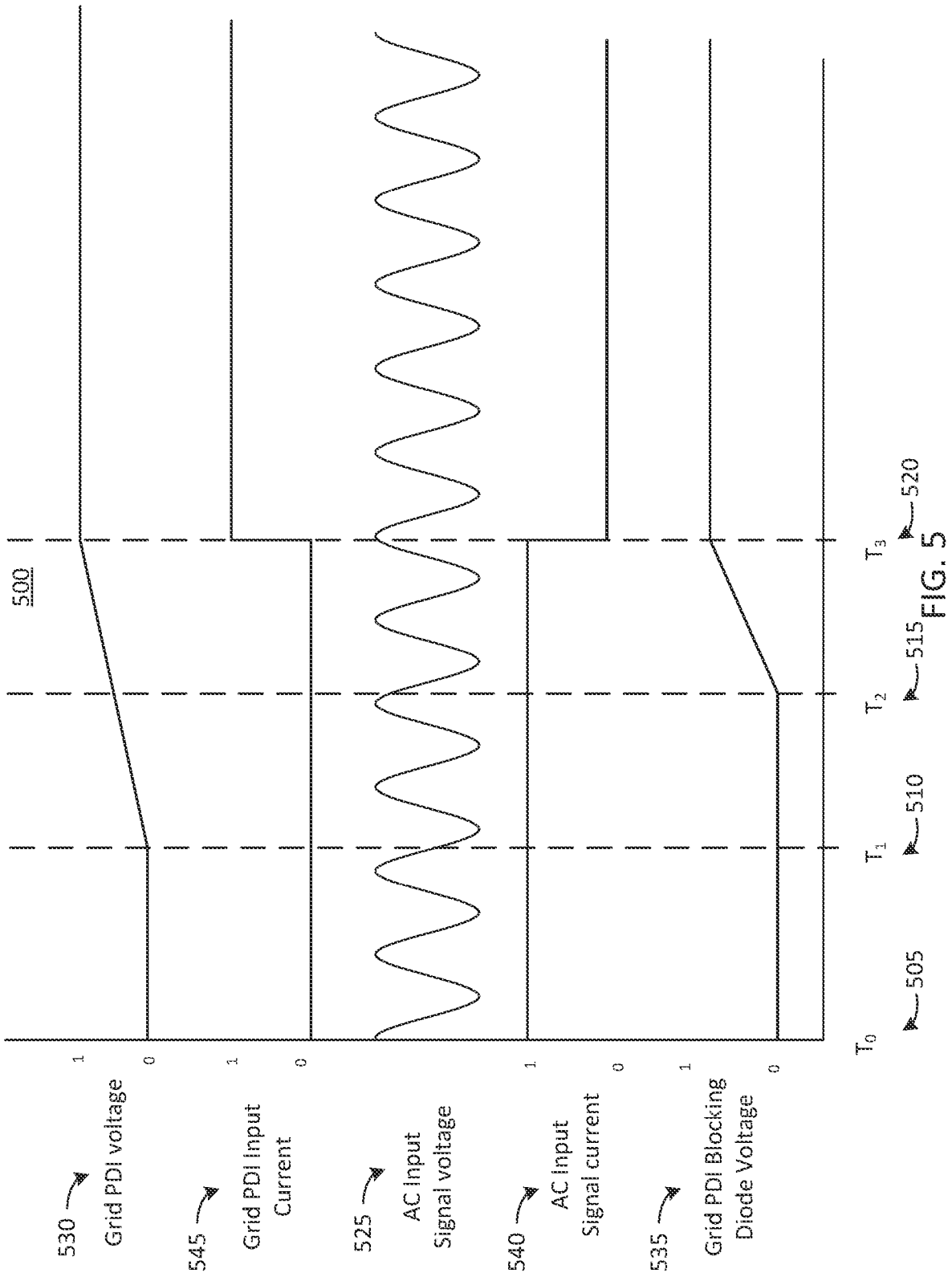
FIG. 5 is a timing diagram for conveying energy from a battery based on energy sourced from an AC input, in accordance with some aspects.

FIG. 5 is a timing diagram 500 for conveying energy from a battery 110 responsive to energy sourced from an AC input 120, in accordance with some aspects. At $T_0$ 505, the AC input 120 receives an AC input signal voltage 525, such as by the application of a plug or receptacle to the AC input 120. As indicated above, the AC input signal voltage 525, like other elements of the various figures herein, are not to drawn scale, and indeed, are scaled to emphasize certain features such as the indicated AC waveform.

The AC input 120 can receive energy from a port of an electric vehicle 205, a generator, or another energy source. The AC input 120 can provide energy to the power conversion circuit 114 or the low voltage bus 124. The application of the power can cause an activation of the controller 118 (e.g., booting, restarting, or transitioning from a low energy state to another energy state). The controller 118 can cause the pre-charge circuit 116 to energize a conductor of the battery PDI 108 and receive, from a sensor 405, an indication of a condition of the insulation thereof. The controller 118 can receive an indication of the voltage of a corresponding energy source (e.g., battery 110) from the battery PDI 108 or the electric vehicle 205. The controller 118 can cause the pre-charge circuit 116 to charge the capacitor 112 based on the voltage of the corresponding energy source. For example, the controller 118 can cause the pre-charge circuit 116 to charge the capacitor 112 to a same voltage of the corresponding energy source (e.g., to avoid an inrush current). The controller 118 can cause the pre-charge circuit 116 to charge the capacitor 112 to a lesser voltage than the corresponding energy source (e.g., to cause current to flow from the battery 110). The controller 118 can cause the pre-charge circuit 116 to charge the capacitor 112 to a lesser voltage than the corresponding energy source (e.g., e.g., to account for diode drops or resistive losses between the energy conversion device 102 and the corresponding energy source).

At $T_1$ 510, the controller 118 causes a switchable connection 410 between the energy conversion device 102 and the corresponding energy source to close. Upon a closure of the switchable connection 410, power can flow between the energy conversion device 102 and the corresponding energy source. The power can increase a grid PDI voltage 530, such as to deliver power to a structure or other sink associated with the power conversion device 102. At $T_2$ 515, the grid PDI blocking diode input voltage 535 increases, responsive the voltage increase of the grid PDI voltage 530. At $T_3$ 520, the grid PDI voltage 530 exceeds the voltage of the AC input 120 such that the associated blocking diodes 305 source current from the grid PDI 104. Thus, the average AC input current 540 to the low voltage bus 124 or the power conversion circuit 114 reduces, and the grid PDI current 545 to the low voltage bus 124 or the power conversion circuit 114 increases.

The controller 118 can cause an indication of one or more statuses to be presented. For example, the controller 118 can indicate a status of the AC input 120, DC input 122, grid side input, the direction of energy flow between the energy conversion device 102 and the energy source, or responsive to other states, events, or conditions sensed or caused by the controller 118. The controller 118 can control a state of one or more LEDs or network communications messages to convey or present the indications.

Figure 6:
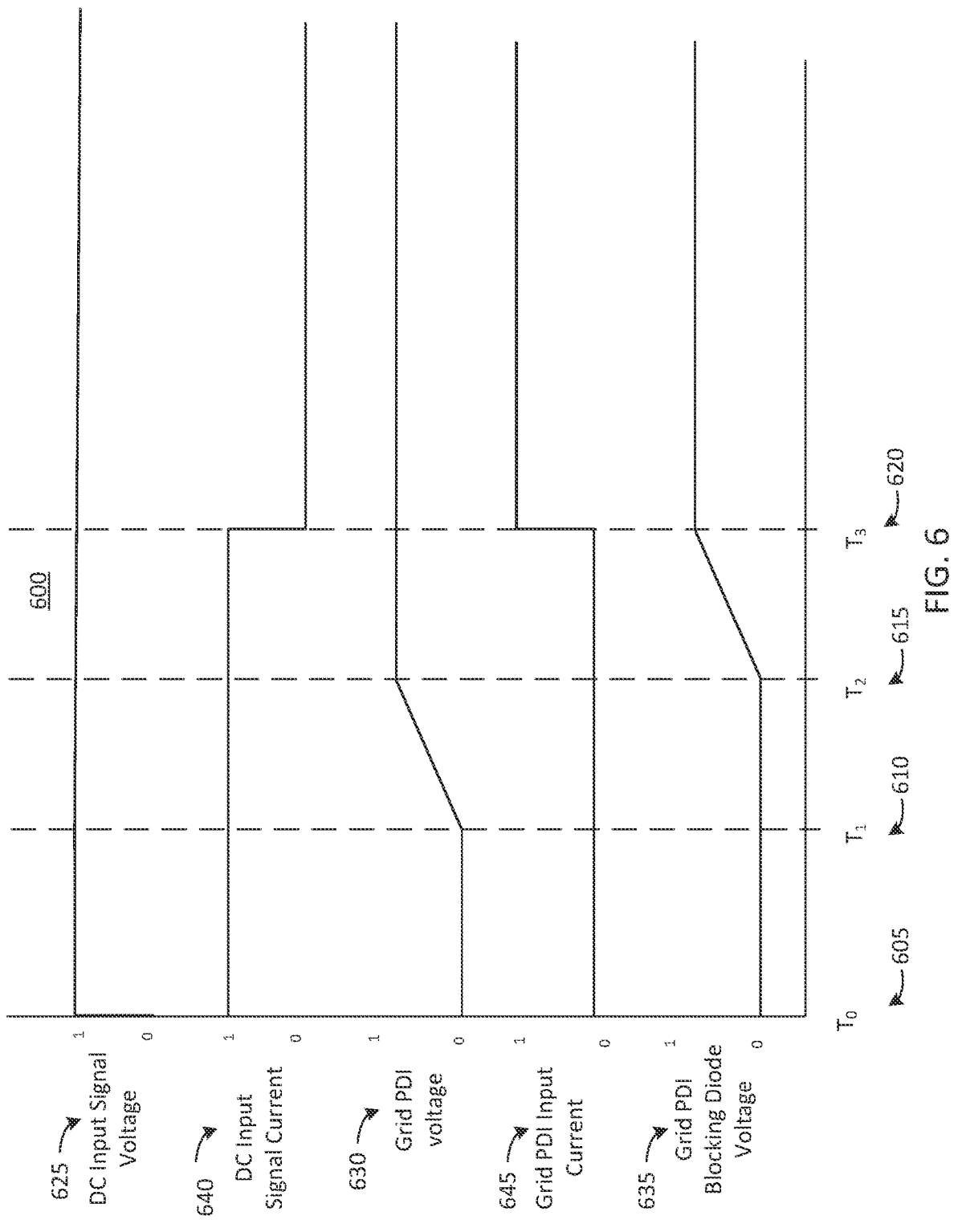
FIG. 6 is a timing diagram for conveying energy from a battery based on energy sourced from a DC input, in accordance with some aspects.

FIG. 6 is a timing diagram 600 for conveying energy from a battery 110 responsive to a voltage generated from a DC input 122, in accordance with some aspects. At $T_0$ 605, the DC input 122 receives a DC input signal voltage 625, such as by the application of a plug or receptacle to the DC input 122. The DC input 122 can receive energy from a battery 110 (e.g., an automotive battery 110 or a mobile device battery 110). For example, the DC input 122 can receive energy from a 12V outlet of an electric vehicle 205, a USB port, jumper cables, or another DC energy source. The DC input 122 can apply the energy, via a blocking diode 305, or other input selector (e.g., a mechanical switch or a relay) to the power conversion circuit 114. The power conversion circuit 114 can provide power to the low voltage bus 124 which can cause an activation of the controller 118 (e.g., booting, restarting, or transitioning from a low energy state to another energy state). The controller 118 can cause the pre-charge circuit 116 to energize a conductor of the battery PDI 108 and receive, from a sensor 405, an indication of a condition of the insulation thereof. The controller 118 can receive an indication of the voltage of a corresponding energy source (e.g., battery 110) from the battery PDI 108 or the electric vehicle 205. The controller 118 can cause the pre-charge circuit 116 to charge the capacitor 112 based on the voltage of the corresponding energy source. For example, the controller 118 can cause the pre-charge circuit 116 to charge the capacitor 112 to a same, lower, or higher voltage than the corresponding energy source.

At $T_1$ 610, the controller 118 causes a switchable connection 410 between the energy conversion device 102 and the corresponding energy source to close. Upon a closure of the switchable connection 410, power can flow between the energy conversion device 102 and the corresponding energy source. The power can increase a grid PDI voltage 630, such as to deliver power to a structure or other sink associated with the power conversion device. At $T_2$ 615, the grid PDI blocking diode input voltage 635 increases, responsive the voltage increase of the grid PDI voltage 630. At $T_3$ 320, the grid PDI blocking diode input voltage 635 exceeds the voltage of the DC input 122 such that the associated blocking diodes 305 source current from the grid PDI 104. Thus, the DC input current 640 to the low voltage bus 124 reduces, and the grid PDI current 645 to the low voltage bus 124 increases.

Figure 7:
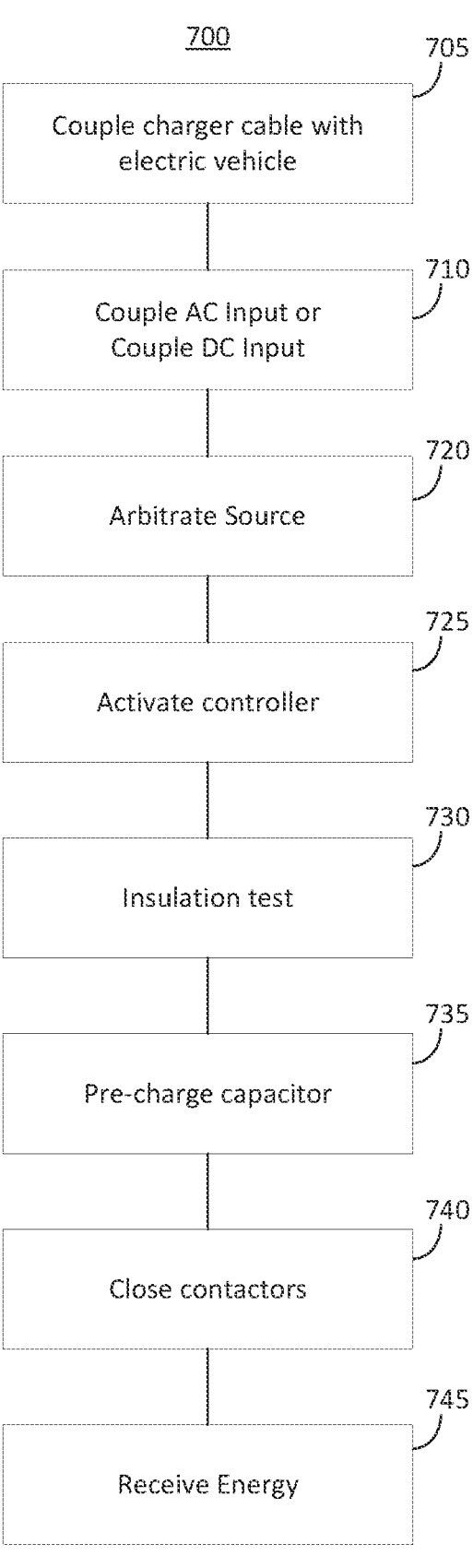
FIG. 7 is a flow diagram for a method of conveying energy from a battery of an electric vehicle 205, in accordance with some aspects.

FIG. 7 is a flow diagram for a method 700 of conveying energy from a battery 110 of an electric vehicle 205, in accordance with some aspects. The method 700 can be performed by one or more components or systems depicted in FIG. 1, 2, 3, 4, or 9 including, for example, a controller 118 of the energy conversion device 102. The method 700 can likewise incorporate, substitute, or omit operations depicted throughout this disclosure. Various substitutions, additions, or omissions can be made to these ACTs, like other systems and methods of the present disclosure. For example, a controller 118 can convey various indications of status, or receive commands via a user interface.

At ACT 705, a charger cable of the battery PDI 108 is coupled with an electric vehicle 205. The charger cable can include conductors for energy delivery or data transport having insulation associated therewith. The charger cable can include or interface with a switchable connection 410, or a sensor 405. The controller 118 can receive an indication of the coupling of the charging cable, such as an electrical or mechanical switch or loopback connection (e.g., a presence detection pin). The energy conversion device 102 can be in a low power state. A switchable connection 410 of the energy conversion device can be normally open or otherwise in an open state.

At ACT 710, the energy conversion device 102 can receive a user accessible AC input 120 connection. For example, the AC input 120 can receive a 120V signal or 240V signal. The AC signal can be sourced from an electric vehicle 205 (e.g., by a same or different cable than the charging cable of ACT 705), a generator, or an outlet connected to a grid 106. Still referring to ACT 720, the energy conversion device 102 can receive a user accessible DC input 122 connection. For example, the DC input 122 connection can apply a voltage between two terminals of the energy conversion device 102. The DC signal can be sourced from an automotive battery 110, mobile device, mobile device charger, or the electric vehicle 205 (e.g., via jumper cables, or a plug or receptacle for a 12V outlet).

At ACT 720, the energy conversion device 102 arbitrates an energy source. For example, the arbitration can be passive such as according to a higher voltage provided to parallel blocking diodes 305. The energy conversion device 102 can source energy from a grid PDI 104, an AC input 120, a DC input 122, or a battery backup. A highest voltage can supply energy to a controller 118 of the energy conversion device 102. For example, a battery backup can be depleted or omitted, a grid 106 associated with a grid PDI 104 can be unavailable, and a coupling of a DC input 122 can be omitted. The AC input 120 can be selected according to the highest voltage applied to parallel blocking diodes 305, and can thus deliver power to the controller 118. The energy conversion device 102 can arbitrate energy sources according to various passive or active controls. For example, a mechanical switch can select an energy source or the controller 118 can select from energy sources according to a solid state or mechanical relay, contactor, or other switch.

At ACT 725, the controller 118 can activate. The activation can be responsive to a signal (e.g., a power signal of the low voltage DC bus). For example, the activation can be a power-on boot of the controller 118, or another change of a power state of the controller 118. Upon activation, the controller 118 can access one or more memories to execute various instructions, receive one or more signals related to the condition of the energy conversion device 102 (e.g., the electric vehicle 205 coupled thereto, or the voltage of the battery 110 of the electric vehicle 205). The controller 118 can cause an indication of the state of the energy conversion device 102 to be conveyed, such as by network communication, or an actuation of an element of a user interface (e.g., an LED).

At ACT 730, the controller 118 can execute an insulation test for the battery PDI 108. For example, the controller 118 can cause the pre-charge circuit 116 to charge the capacitor 112 to a test voltage. The pre-charge circuit 116 can source energy from a same power input delivered to the controller 118. The controller 118 can thereafter receive an indication of a condition of the insulation. At ACT 735, the controller 118 can pre-charge the capacitor 112 to an operating voltage. The controller 118 can determine the operating voltage based on data received from the electric vehicle 205. For example, the data can include the connection of the charging cable, an indication of a nominal voltage, or an indication of a present voltage. The controller 118 can receive a message indicative of a power event of the grid 106, or an condition of the battery 110 (e.g., capacity, state of charge, or temperature). The controller 118 can convey the state or other information (e.g., remaining battery life or power-on time) via a user interface or network connection.

At ACT 735, the controller 118 can cause one or more switchable connections 410 (e.g., contactors) to close. The contactors can be a part of the charging cable or the electric vehicle 205. For example, the controller 118 can cause the one or more switchable connection 410 to close by conveying a signal to the electric vehicle 205, or the battery PDI 108. Responsive to the closure of the switchable connections 410, the energy conversion device 102 can receive energy from the battery 110 at ACT 740. For example, the energy conversion device 102 can cause a first portion of the received energy to power the energy conversion device 102, and deliver a second portion of the received energy to an energy sink such as circuits of an associated structure or the grid 106.

Figure 8:
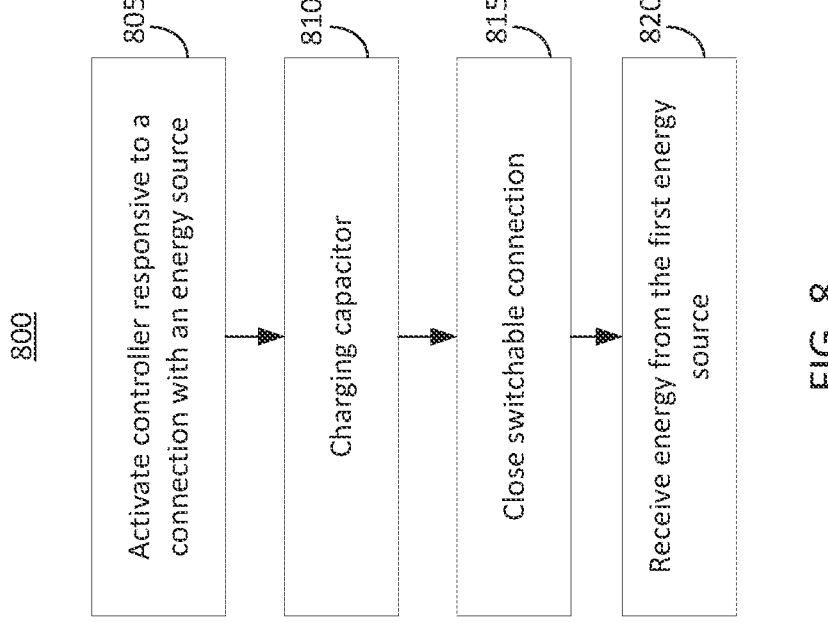
FIG. 8 is a flow diagram for a method of conveying energy from a battery of an electric vehicle 205, in accordance with some aspects.

FIG. 8 is a flow diagram for a method 800 of conveying energy from a battery 110 of an electric vehicle 205, in accordance with some aspects. The method 800 can be performed by one or more components or systems depicted in FIG. 1, 2, 3, 4, or 9 including, for example, a controller 118 of the energy conversion device 102. The method 700 can likewise incorporate, substitute, or omit operations depicted throughout this disclosure. Various substitutions, additions, or omissions can be made to these ACTs, like other systems and methods of the present disclosure. For example, a the energy conversion device 102 can receive energy from the grid 106, and thereupon charge the battery 110 of the electric vehicle 205 prior or subsequent to the explicit ACTs described herein.

At ACT 805, the controller 118 activates responsive to a connection with an energy source. For example, the energy source can be supplied to a user-accessible input, and the activation of the controller 118 can be a power-on boot. The controller 118 can run various routines such as establishing communication with various portion (e.g., sensors 405, switchable connections 410, or memories) of the energy conversion device 102. At ACT 810, the controller 118 can cause a capacitor 112 to charge. For example, the capacitor 112 can charge to a test or operating voltage. At ACT 815, the controller 118 can cause a switchable connection 410 to close. For example, the switchable connection 410 can connect the energy conversion device 102 to an energy source (e.g., a battery 110 or generator). At ACT 820, the controller 118 can receive power from the energy source. The energy source can be independent or associated with the energy source of ACT 805. For example, the energy source of ACT 805 can be an auxiliary energy source (e.g., AC or DC output) of an electric vehicle 205, and the energy source of ACT 820 can be a higher power energy source of the same electric vehicle 205. Such an example is non-limiting, and various energy sources can include different electric or non-electric vehicle, batteries, or other energy storage or delivery devices.

Figure 9:
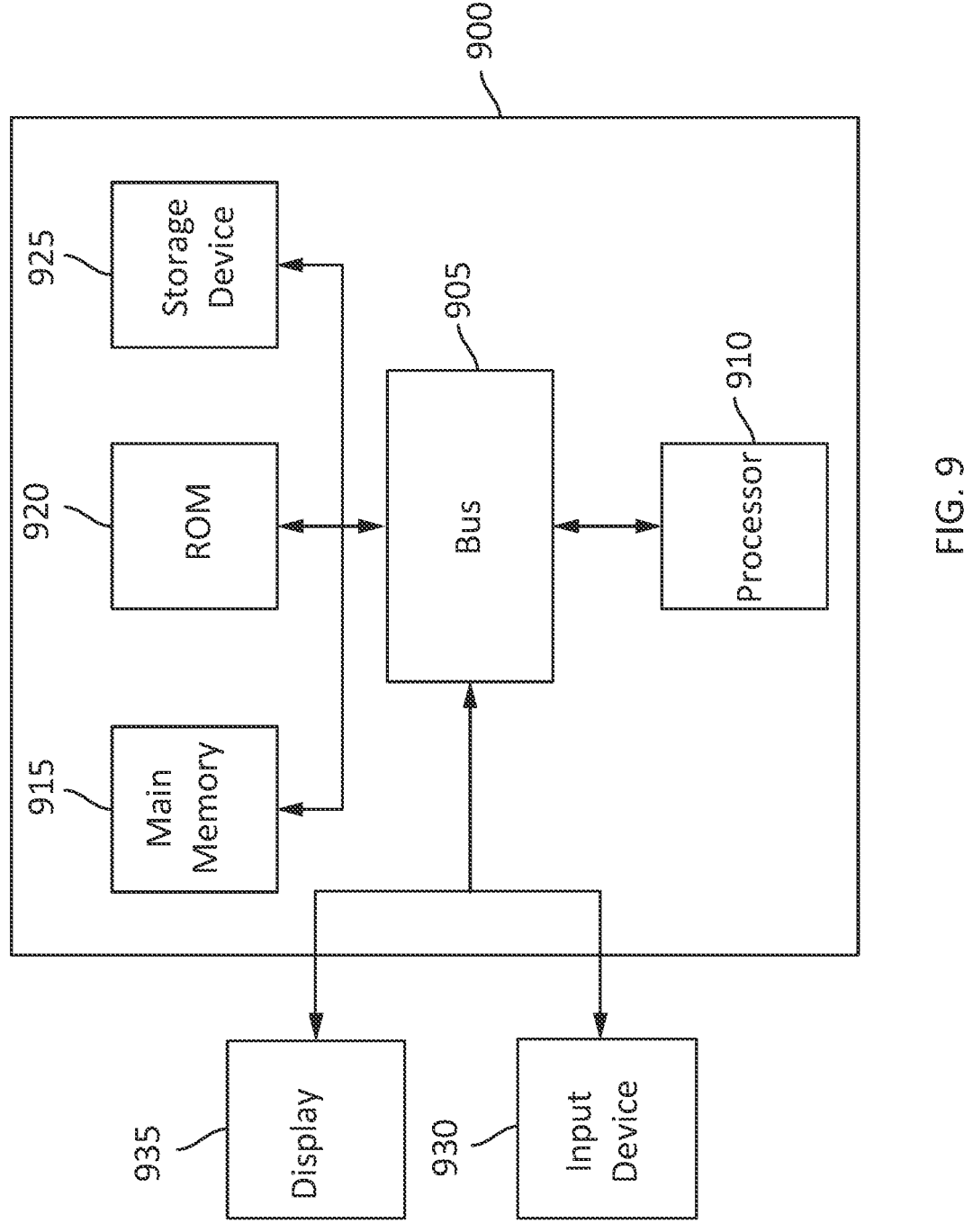
FIG. 9 is a block diagram illustrating an architecture for a computer system that can be employed to implement elements of the systems and methods described and illustrated herein.

FIG. 9 depicts an example block diagram of an example computer system 900. The computer system 900 or computing device 900 can include or be used to implement a data processing system or its components. The computing system 900 includes at least one bus 905 or other communication component for communicating information and at least one processor 910 or processing circuit coupled to the bus 905 for processing information. The computing system 900 can also include one or more processors 910 or processing circuits coupled to the bus for processing information. The computing system 900 also includes at least one main memory 915, such as a random access memory (RAM) or other dynamic storage device, coupled to the bus 905 for storing information, and instructions to be executed by the processor 910. The main memory 915 can be used for storing information during execution of instructions by the processor 910. The computing system 900 may further include at least one read only memory (ROM) 920 or other static storage device coupled to the bus 905 for storing static information and instructions for the processor 910. A storage device 925, such as a solid state device, magnetic disk or optical disk, can be coupled to the bus 905 to persistently store information and instructions.

The computing system 900 may be coupled via the bus 905 to a display 935, such as a liquid crystal display, or active matrix display, for displaying information to a user such as a driver of the electric vehicle 205 or other end user. An input device 930, such as a keyboard or voice interface may be coupled to the bus 905 for communicating information and commands to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP. PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, voltages to charge batteries or test insulation can be inverted according to a defined reference voltage. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:

an energy conversion device, the energy conversion device comprising:

one or more power delivery interfaces;

a pre-charge circuit configured to charge a capacitor to an operating voltage;

a user accessible interface configured to provide energy to the pre-charge circuit to charge the capacitor associated with the one or more power delivery interfaces, the user accessible interface comprising:

a direct current (DC) input; and an alternating current (AC) input; and a controller to:

charge the capacitor to a test voltage prior to charging the capacitor to the operating voltage;

detect an insulation resistance of at least a portion of a first power delivery interface;

compare the insulation resistance to a minimum insulation resistance; and determine that the operating voltage is permitted, responsive to the insulation resistance meeting or exceeding the minimum insulation resistance.

2. The system of claim 1, comprising the user accessible interface to:

convert a voltage received by the user accessible interface to an interface voltage for the pre-charge circuit, wherein:

the interface voltage is higher than the voltage received by the user accessible interface;

the interface voltage is determined by a controller based on a communication channel established between an electric vehicle and the controller; and at least one of the one or more power delivery interfaces is configured to provide first energy in a first mode of operation, and to receive second energy in a second mode of operation.

3. The system of claim 1, wherein:

the DC input comprises a DC to DC converter to convert a first voltage received by the user accessible interface to a voltage of a DC bus;

the AC input comprises:

a rectification circuit to rectify a signal received from the AC input; and an AC to DC conversion circuit to convert the rectified signal to the voltage of the DC bus; and the DC input and the AC input are each separated from the DC bus by a respective diode.

4. The system of claim 1, comprising the energy conversion device to:

establish a communication channel with an electric vehicle;

determine a voltage of a battery of the electric vehicle; and pre-charge the capacitor to a voltage based on the voltage of the battery.

5. The system of claim 1, comprising the energy conversion device to:

connect an energy storage device via a first power delivery interface;

receive energy from a second power delivery interface while connected to the energy storage device;

detect a power event at the second power delivery interface; and receive, incident to the detection of the power event, energy from the energy storage device via the first power delivery interface.

6. The system of claim 1, comprising:

the user accessible interface to provide energy to a controller, the controller to activate, responsive to the provision of energy, and thereupon provide a control signal to charge the capacitor to a test voltage in excess of 500 volts;

the controller to determine a condition of insulation associated with a bidirectional power delivery interface; and the controller to cause the capacitor to be charged to the operating voltage in excess of 270 volts to configure the energy conversion device to receive energy from a battery of an electric vehicle.

7. The system of claim 1, wherein the energy conversion device comprises:

a first power delivery interface to interface with an electric vehicle; and a second power delivery interface to interface with a power grid;

wherein the first power delivery interface provides energy to the electric vehicle in a first mode of operation and receives energy from the electric vehicle in a second mode of operation.

8. The system of claim 1, comprising a controller to:

activate, responsive to the provision of energy, and thereupon establish a communication channel with an electric vehicle;

receive, from the electric vehicle, a voltage for a battery of the electric vehicle;

provide a first control signal to charge the capacitor to a battery voltage of the electric vehicle;

detect a completion of the charging of the capacitor; and provide a second control signal to close a switchable connection of the one or more power delivery interfaces.

9. The system of claim 1, comprising a controller to:

cause a notification to be presented, the notification indicative of a status of the energy conversion device.

10. A method, comprising:

activating a controller based on connecting a first power delivery interface between an energy conversion device and a first energy source and connecting a user accessible interface to a second energy source;

charging a capacitor to a test voltage in excess of 500 volts and exceeding a voltage supplied by the second energy source, wherein the user accessible interface includes a DC input and an AC input, and the second energy source is coupled to the DC input or the AC input;

closing a switchable connection between the energy conversion device and the first energy source;

receiving energy from the first energy source at the first power delivery interface;

determining a condition of insulation associated with a bidirectional power delivery interface; and causing the capacitor to be charged to an operating voltage in excess of 270 volts to configure the energy conversion device to receive energy from a battery of an electric vehicle.

11. The method of claim 10, wherein:

the first energy source is a battery of an electric vehicle; and the interface is isolated from the first energy source.

12. The method of claim 10, wherein:

the DC input comprises a DC to DC converter to convert a first voltage received by the user accessible interface to a voltage of a DC bus;

the AC input comprises:

a rectification circuit to rectify a signal received from the AC input; and an AC to DC conversion circuit to convert the rectified signal to the voltage of the DC bus; and the DC input and the AC input are each separated from the DC bus by a respective diode.

13. The method of claim 10, comprising the controller to cause a notification to be presented, the notification indicative of a power event.

14. An energy conversion device, comprising:

a first power delivery interface configured to interface with an energy source, the first power delivery interface including a normally open switchable connection;

a user accessible interface to provide power to a controller, the user accessible interface comprising:

a DC input; and an AC input;

the controller configured to activate in response to the provision of energy;

the controller to generate a first control signal to charge a capacitor associated with the first power delivery interface to a test voltage in excess of 500 volts;

the controller to determine a condition of insulation associated with a bidirectional power delivery interface; and the controller to cause the capacitor to be charged to an operating voltage in excess of 270 volts to configure the energy conversion device to receive energy from a battery of an electric vehicle.

15. The energy conversion device of claim 14, comprising the controller to:

receive power from a second power delivery interface;

establish a communication channel with an electric vehicle comprising the energy source attached to the energy conversion device via the first power delivery interface;

charge the capacitor to a charging voltage equal to or exceeding a battery voltage of a battery of the electric vehicle;

detect a completion of the charging of the capacitor;

close a switchable connection between the energy conversion device and the electric vehicle to charge the battery of the electric vehicle;

detect a power event at the second power delivery interface; and responsive to the detection of the power event, receive power from the electric vehicle and maintain an electrical connection with the electric vehicle whereby a first portion of the energy from the electric vehicle powers the controller, and a second portion of the energy from the electric vehicle is provided to an output circuit.

16. The energy conversion device of claim 14, comprising:

the DC input including a DC to DC converter to convert a first voltage received by the user accessible interface to a voltage of a DC bus;

the AC input including:

a rectification circuit to rectify a signal received from the AC input; and an AC to DC conversion circuit to convert the rectified signal to the voltage of the DC bus; and the DC input and the AC input are each separated from the DC bus by a respective diode.

17. The energy conversion device of claim 14, comprising the user accessible interface to receive an AC voltage, and wherein the controller is configured to charge the capacitor to a voltage in excess of the AC voltage.

18. The energy conversion device of claim 14, comprising the user accessible interface to receive a DC voltage, and wherein:

the DC voltage is less than a charging voltage of the capacitor; and the DC voltage is isolated from the charging voltage of the capacitor.

19. The energy conversion device of claim 14, comprising the controller to cause a notification to be presented, the notification indicative of a power event.

* * * * *